July 28, 1931.    J. E. CARLIN    1,816,359
SCREW DRIVER
Filed May 18, 1929
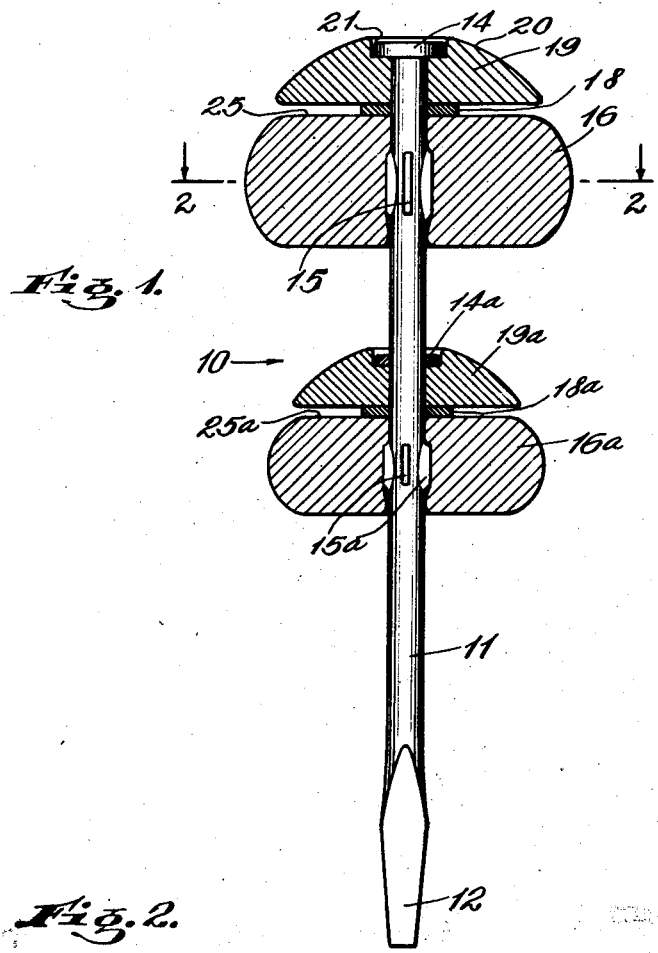
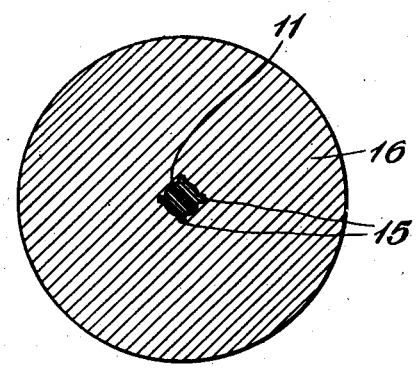
INVENTOR.
Julius E. Carlin
BY
ATTORNEY Patented July 28, 1931

1,816,359

UNITED STATES PATENT OFFICE

JULIUS E. CARLIN, OF FREEHOLD, NEW JERSEY

SCREW-DRIVER

Application filed May 18, 1929. Serial No. 364,118.

This invention relates to screw-drivers.

An object of this invention is to provide a device of the character described which may be readily and comfortably manipulated by one or both hands for applying increased pressure and turning forces to either a right or left hand screw, and which device may be operated without removing the hands therefrom or disengaging said device from the screw.

A further object of this invention is to provide a rugged, neat and compact device of the character described, which shall comprise few and simple parts, be relatively cheap to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is an elevational side view of a screw driver embodying the invention with parts in cross-section; and Fig. 2 is a cross-sectional view taken on line 2—2 of Fig. 1.

Referring in detail to the drawings, 10 designates a screw-driver embodying the invention, here seen to comprise a central shank or rod 11 of any suitable cross-section provided with the usual beveled edge portion 12 for engaging in the kerf of a screw.

At the upper end thereof the rod 11 is provided with a flat, disc-like head 14. Below said head 14, the rod 11 is formed with a plurality of integral outwardly extending, radial, rib like projections 15, and mounted on said rod is an annular knob-like handle member 16 fixed to said rod by said projections. Said handle 16 may be made of wood, hard rubber or any other suitable material, and is preferably of somewhat enlarged radius for a purpose hereinafter appearing. Fitted on said rod 11 is a washer 18 contacting the upper flat surface 25 of said handle 16, and interposed between said washer and head 14, for free rotation with respect to said rod 11 in both directions, is a member 19 having a substantially spherical upper surface 20. Said member 19 is preferably countersunk as at 21 for receiving the head 14 below the upper surface thereof and is so shaped as to form with the handle member 16, substantially a portion of a knob or sphere which may comfortably be received in the palm of the hand.

The rod 11 is provided with a plurality of rib members 15a similar to rib members 15 and spaced below the same. Fixedly mounted on said rod 11 as by engagement with said ribs 15a, is an annular member 16a substantially similar in shape to member 16. A washer 18a, received on the rod 11, rests on the upper surface 25a of the member 16a and superimposed on said washer is a member 19a similar to member 19 and likewise rotatable with respect to said rod. A fixed collar 14a serves to retain the member 19a against sliding movement. The members 16a and 19a may be made of the same size as the members 16 and 19 respectively to permit interchanging of the parts, or as illustrated, the former members may be made somewhat smaller.

The operation of the device will now be clear. The screw-driver may be manipulated by use of one hand and without the necessity of removing the beveled edge 12 from the kerf of the screw after each turn of the screw-driver. The palm of the hand contacts and presses down on the upper surface 20 of the member 19 and the fingers grasp the outer peripheral portion of the member 16. The device may then be turned in the usual manner, for actuating the screw. During this operation the members 16 and 19 move together. The hand may then be turned in the opposite direction to its original position by simply releasing the grasp of the fingers from said member 16, the palm of the hand however still pressing down on the member 19. Since the member 19 is movable relative to the rod 11, said member may turn with the hand in either direction. The screw-driver may thus remain in steady upright and screw engaging position, throughout the entire screwing operation. It will be noted that considerable downward pressure may be applied to the screw driver without adding to the discomfort of the hand, since the handle 16, 19 is shaped substantially like a ball and may be grasped like a knob. Furthermore, the relatively large wheel or handle member 16 provides a large leverage for producing an increased torque, whereby the larger screws may be actuated. It will be noted that the screw-driver is equally effective with either right or left hand screws without adjustment of any kind.

It will be further noted that since the head 14 of the shank 11 extends below the surface 20 of member 16, the hand will not contact said head during manipulation of the screw driver.

The screw-driver may furthermore be operated by use of both hands, one hand manipulating the upper handle members 16, 19 in the manner above described, and the other hand simultaneously grasping and turning the handle members 16a, 19a.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawings is to be interpreted as illustrative and not in a limiting sense.

Having thus described my invention I claim as new and desire to secure by Letters Patent:

1. A screw-driver comprising a single rod having a beveled edge portion, a disc-shaped member of relatively large diameter fixedly mounted thereon, a second member of relatively small diameter rotatably mounted on said rod in proximity to said first mentioned member, a disc-shaped member of relatively large diameter fixedly mounted on said rod at a point spaced from said first named fixed member, and a member of relatively small diameter rotatably mounted on said rod in proximity to said last named fixed member.

2. A screw driver comprising a single rod having a beveled edge portion, a disc-shaped member fixedly mounted thereon, a second member rotatably mounted on said rod in proximity to said first mentioned member, a disc-shaped member fixedly mounted on said rod at a point spaced from said first named fixed member, and a member rotatably mounted on said rod in proximity to said last named fixed member, each pair of adjacent fixed and rotatable members being shaped to substantially form a portion of a sphere.

In testimony whereof I affix my signature.

JULIUS E. CARLIN.